United States Patent
Kim et al.

(10) Patent No.: US 12,095,498 B2
(45) Date of Patent: Sep. 17, 2024

(54) METHOD AND APPARATUS FOR HANDLING RADIO LINK FAILURE ON UNLICENSED FREQUENCY IN A WIRELESS COMMUNICATION SYSTEM

(71) Applicant: LG ELECTRONICS INC., Seoul (KR)

(72) Inventors: Sangwon Kim, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 351 days.

(21) Appl. No.: 17/310,830

(22) PCT Filed: Mar. 19, 2020

(86) PCT No.: PCT/KR2020/003735
§ 371 (c)(1),
(2) Date: Aug. 25, 2021

(87) PCT Pub. No.: WO2020/197162
PCT Pub. Date: Oct. 1, 2020

(65) Prior Publication Data
US 2022/0166460 A1    May 26, 2022

(30) Foreign Application Priority Data

Mar. 22, 2019   (KR) .................. 10-2019-0032959
Mar. 22, 2019   (KR) .................. 10-2019-0032961
Mar. 22, 2019   (KR) .................. 10-2019-0032977

(51) Int. Cl.
*H04B 1/74*    (2006.01)
*H04W 48/06*  (2009.01)
(Continued)

(52) U.S. Cl.
CPC .............. *H04B 1/74* (2013.01); *H04W 48/06* (2013.01); *H04W 76/18* (2018.02); *H04W 48/02* (2013.01)

(58) Field of Classification Search
CPC ........ H04B 1/74; H04W 48/06; H04W 76/18; H04W 24/08; H04W 76/15; H04W 48/02; H04W 74/0808; H04W 76/19
See application file for complete search history.

(56) References Cited

U.S. PATENT DOCUMENTS

2015/0105090 A1*  4/2015  Koskela ............... H04W 72/23
                                                              455/561
2016/0338137 A1   11/2016  Mishra et al.
(Continued)

OTHER PUBLICATIONS

Chen et al., "Enhanced Random Access Procedure for NR-U", FG Innovation Company Limited, U.S. Appl. No. 62/734,632, filed Sep. 21, 2018, Total pp. 21 (Year: 2018).*
(Continued)

*Primary Examiner* — Shah M Rahman
(74) *Attorney, Agent, or Firm* — LEE, HONG, DEGERMAN, KANG & WAIMEY

(57) ABSTRACT

A method and apparatus for handling radio link failure on unlicensed frequency in a wireless communication system is provided. A wireless device performs Listen Before Talk (LBT) procedure on a serving cell on an unlicensed frequency. A wireless device detects consecutive failures of the LBT procedure on the serving cell. A wireless device bars all cells on the unlicensed frequency for a certain period time.

6 Claims, 16 Drawing Sheets

(51) Int. Cl.
*H04W 76/18* (2018.01)
*H04W 48/02* (2009.01)

(56) References Cited

U.S. PATENT DOCUMENTS

| | | | |
|---|---|---|---|
| 2016/0381606 A1* | 12/2016 | Lou | H04W 36/00224 370/331 |
| 2018/0176961 A1 | 6/2018 | Babaei et al. | |
| 2018/0220459 A1* | 8/2018 | Park | H04W 74/08 |
| 2019/0075597 A1* | 3/2019 | Yerramalli | H04L 5/0091 |
| 2019/0200349 A1* | 6/2019 | Harada | H04W 72/21 |
| 2019/0357292 A1* | 11/2019 | Cirik | H04L 5/0053 |
| 2019/0364565 A1* | 11/2019 | Hmimy | H04W 36/06 |
| 2020/0100293 A1* | 3/2020 | Larsson | H04W 74/0833 |
| 2020/0100294 A1* | 3/2020 | Chen | H04W 80/02 |
| 2020/0221495 A1* | 7/2020 | Chen | H04W 74/0808 |
| 2021/0045031 A1* | 2/2021 | Lee | H04W 24/10 |
| 2021/0058967 A1* | 2/2021 | Oteri | H04W 16/14 |
| 2021/0084583 A1* | 3/2021 | Niu | H04W 48/20 |
| 2021/0195639 A1* | 6/2021 | Kim | H04W 16/14 |
| 2021/0212121 A1* | 7/2021 | Niu | H04W 48/20 |
| 2021/0235500 A1* | 7/2021 | Hong | H04W 76/18 |
| 2021/0250792 A1* | 8/2021 | Shi | H04B 17/309 |
| 2021/0289548 A1* | 9/2021 | Murray | H04W 72/23 |
| 2021/0352724 A1* | 11/2021 | Park | H04W 74/0808 |
| 2021/0377944 A1* | 12/2021 | Noh | H04W 72/23 |
| 2022/0174733 A1* | 6/2022 | Wang | H04W 74/008 |
| 2022/0346147 A1* | 10/2022 | Wang | H04W 74/0866 |

OTHER PUBLICATIONS

PCT International Application No. PCT/KR2020/003735 International Search Report dated Jun. 24, 2020, 3 pages.

Spreadtrum Communications, "Consideration of LBT failure in NR-U," 3GPP TSG-RAN WG2 Meeting #105, R2-1900937, Feb.-Mar. 2019, 2 pages.

Nokia et al., "Impact of UL LBT failure," 3GPP TSG-RAN WG2 Meeting #105, R2-1901181, Feb.-Mar. 2019, 4 pages.

Mediatek Inc., "Detecting and handling systematic LBT failure in MAC," 3GPP TSG-RAN WG2 Meeting #105, R2-1901094, Feb.-Mar. 2019, 4 pages.

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.3.0, Section 5.7, Sep. 2018, 358 pages.

3rd Generation Partnership Project (3GPP), "Technical Specification Group Radio Access Network; NR; User Equipment (UE) procedures in Idle mode and RRC Inactive state (Release 15)," 3GPP TS 38.304 V15.2.0, Section 5.3.1, Dec. 2018, 28 pages.

3rd Generation Partnership Project (3GPP), "Technical Specification Group Radio Access Network; NR; Radio Resource Control (RRC) protocol specification (Release 15)," 3GPP TS 38.331 V15.3.0, Section 5.3.7, Sep. 2018, 445 pages.

* cited by examiner

METHOD AND APPARATUS FOR HANDLING RADIO LINK FAILURE ON UNLICENSED FREQUENCY IN A WIRELESS COMMUNICATION SYSTEM

CROSS-REFERENCE TO RELATED APPLICATIONS

This application is the National Stage filing under 35 U.S.C. 371 of International Application No. PCT/KR2020/003735, filed on Mar. 19, 2020, which claims the benefit of earlier filing date and right of priority to Korean Patent Application Nos. 10-2019-0032959, 10-2019-0032977 and 10-2019-0032961, filed on Mar. 22, 2019, the contents of which are all incorporated by reference herein in their entirety.

TECHNICAL FIELD

The present disclosure relates to a method and apparatus for handling radio link failure on unlicensed frequency in a wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

NR supports operations in unlicensed bands through NR-based access to unlicensed spectrum. It is similar to Licensed-Assisted Access (LAA) and LTE Unlicensed (LTE-U). The primary objective of NR-U is to extend the applicability of NR to unlicensed spectrum bands. Regarding the deployment modes, NR-U supports carrier aggregation, dual connectivity, and standalone operation in unlicensed.

One of the issues to operate in unlicensed spectrum is to ensure a fair and harmonious coexistence with other unlicensed systems. Listen Before Talk (LBT) is a spectrum sharing mechanism by which a device senses the channel using a Clear Channel Assessment (CCA) check before accessing to it. LBT works across different RATs, and it is adopted by LAA, MulteFire, Wi-Fi, and WiGig to comply with the regulation.

When LBT is applied, the transmitter listens to/senses the channel to determine whether the channel is free or busy. If the channel is determined to be free, the transmitter may perform the transmission. Otherwise, it does not perform the transmission.

SUMMARY

When a wireless device detects radio link failure (RLF) of a master cell group (MCG), a wireless device may initiate RRC re-establishment procedure to recover the radio link. Upon the initiation of the RRC re-establishment procedure, the wireless device may perform cell selection procedure. The wireless device may optimise cell selection by using stored information, for example, frequencies. Optionally, the wireless device may also use information on cell parameters for the cell selection A wireless device may declare radio link failure upon detecting consecutive LBT failures on an unlicensed frequency. When a wireless device declares the RLF, the wireless device may perform cell selection using stored information. In this case, the wireless device may generally perform cell selection on the last serving frequency.

However, if the last serving frequency is still busy, the RRC re-establishment procedure to the last serving frequency will be failed due to LBT failure. Therefore, studies for handling RLF on unlicensed frequency in a wireless communication system is needed.

In an aspect, a method performed by a wireless device in a wireless communication system is provided. A wireless device performs Listen Before Talk (LBT) procedure on a serving cell on an unlicensed frequency. A wireless device detects consecutive failures of the LBT procedure on the serving cell. A wireless device bars all cells on the unlicensed frequency for a certain period time.

In another aspect, a wireless device in a wireless communication system is provided. The wireless device includes a transceiver, a memory, and at least one processor operatively coupled to the transceiver and the memory. The processor is configured to perform Listen Before Talk (LBT) procedure on a serving cell on an unlicensed frequency. The processor is configured to detect consecutive failures of the LBT procedure on the serving cell. The processor is configured to bar all cells on the unlicensed frequency for a certain period time.

The present disclosure can have various advantageous effects.

According to some embodiments of the present disclosure, a wireless device could handle RLF on unlicensed frequency.

For example, a wireless device could perform a cell selection on less-busy frequency.

For example, the recovery failure rate could be reduced when the RLF happens on unlicensed frequency.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various

DESCRIPTION

Figure 1:
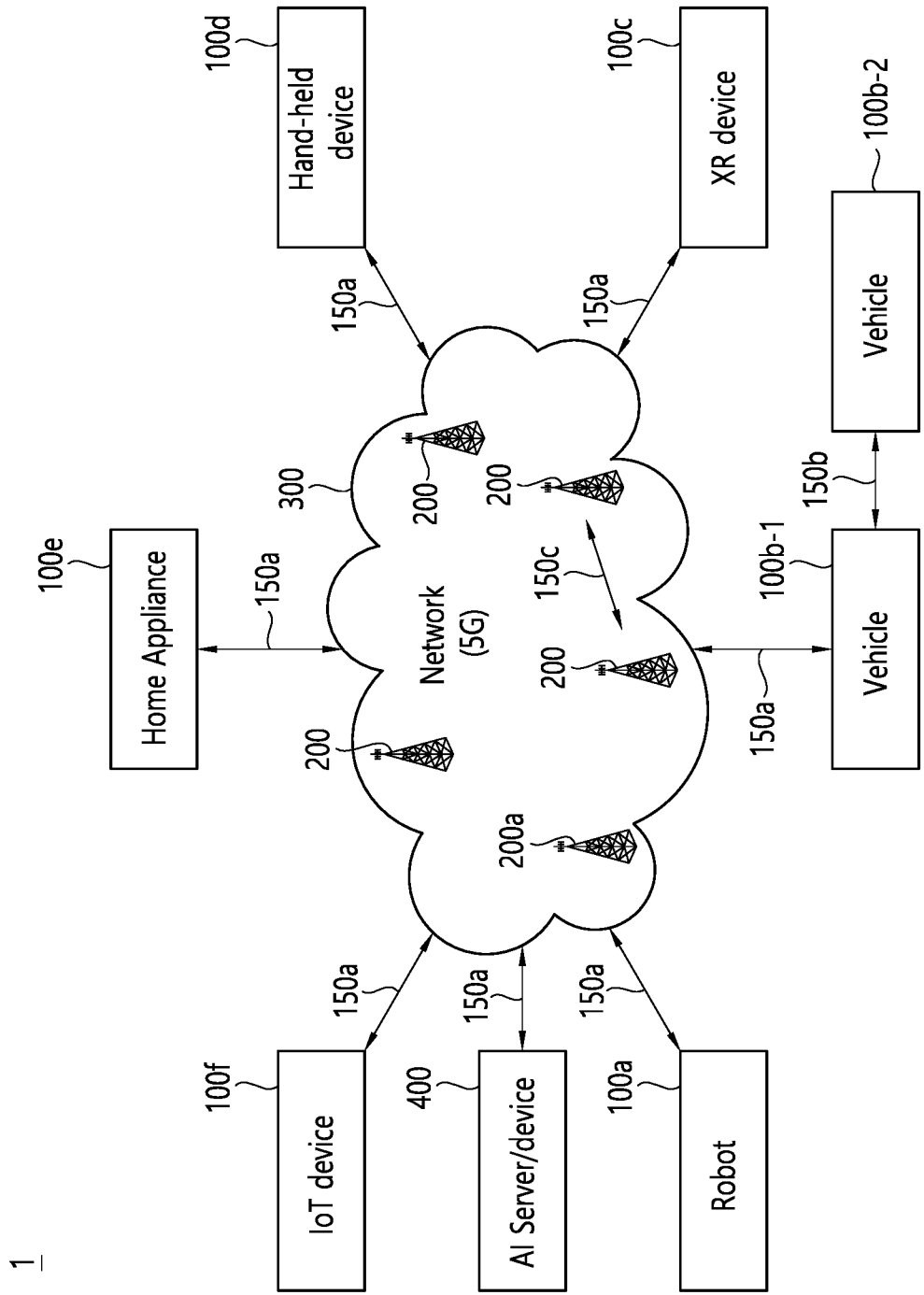
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructable wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
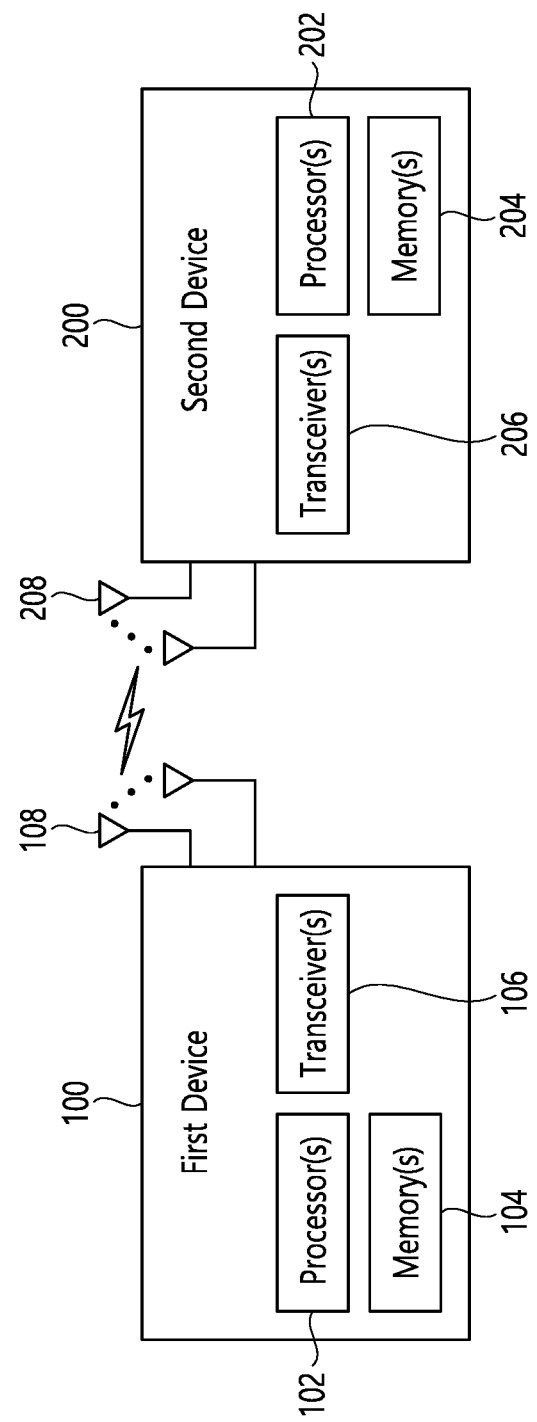
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
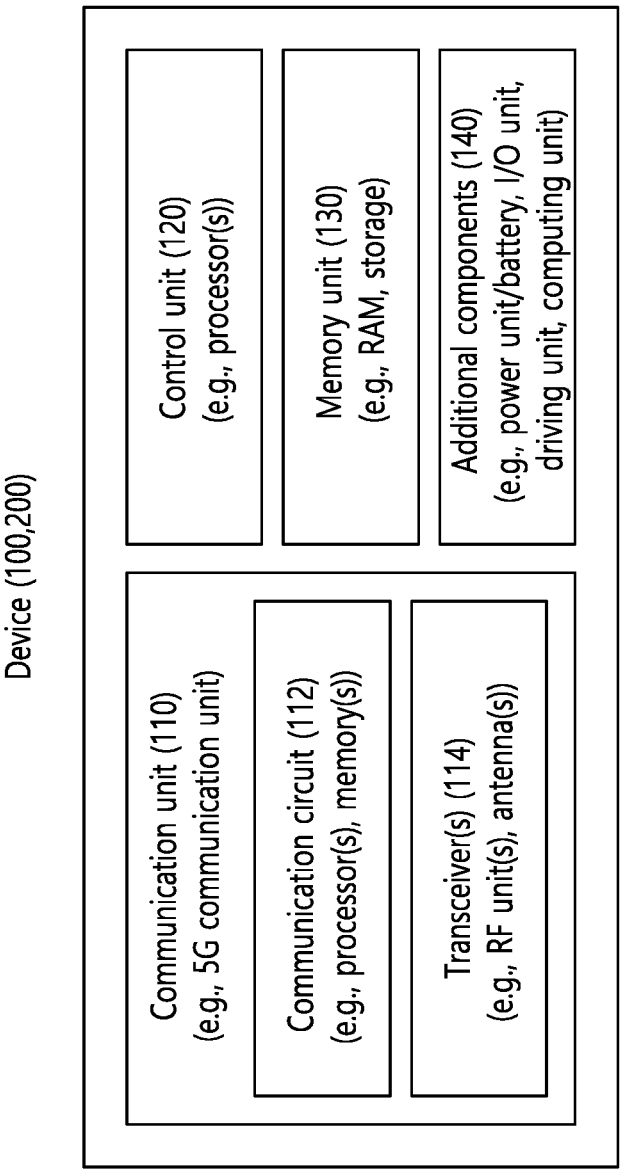
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
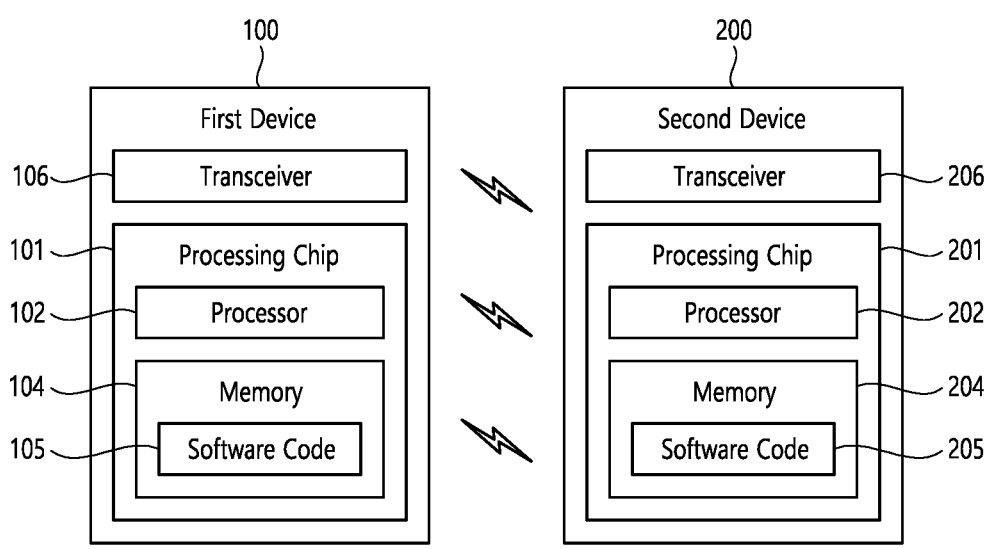
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
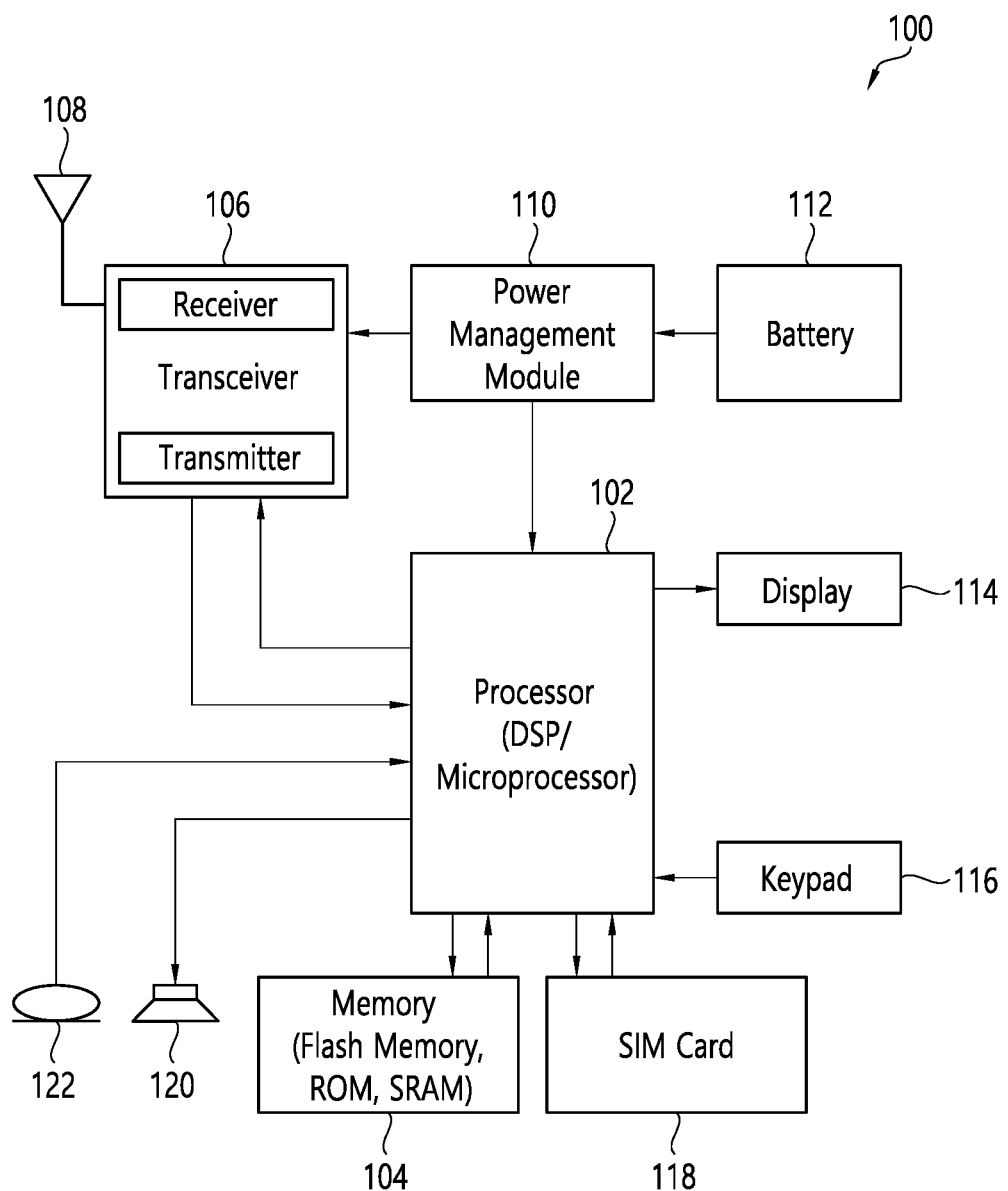
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Hereinafter, an apparatus for handling radio link failure on unlicensed frequency in a wireless communication system, according to some embodiments of the present disclosure, will be described.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106. The processor 102 may be configured to perform Listen Before Talk (LBT) procedure on a serving cell on an unlicensed frequency. The processor 102 may be configured to detect consecutive failures of the LBT procedure on the serving cell. The processor 102 may be configured to deprioritize the unlicensed frequency to be a lowest priority frequency.

Hereinafter, a processor for a wireless device for handling radio link failure on unlicensed frequency in a wireless communication system, according to some embodiments of the present disclosure, will be described.

The processor may be configured to control the wireless device to perform Listen Before Talk (LBT) procedure on a serving cell on an unlicensed frequency. The processor may be configured to control the wireless device to detecting consecutive failures of the LBT procedure on the serving cell. The processor may be configured to control the wireless device to deprioritizing the unlicensed frequency to be a lowest priority frequency.

Hereinafter, a non-transitory computer-readable medium has stored thereon a plurality of instructions for public warning system on unlicensed frequency in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device. The stored a plurality of instructions may cause the wireless device to perform Listen Before Talk (LBT) procedure on a serving cell on an unlicensed frequency. The stored a plurality of instructions may cause the wireless device to detect consecutive failures of the LBT procedure on the serving cell. The stored a plurality of instructions may cause the wireless device to deprioritize the unlicensed frequency to be a lowest priority frequency.

Figure 6:
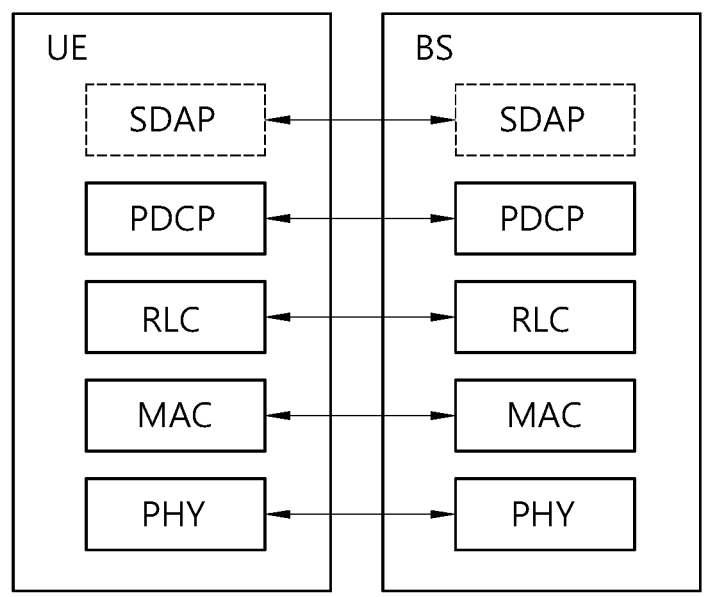
FIGS. 6 and 7 show an example of protocol stacks in a 3GPP based wireless communication system to which implementations of the present disclosure is applied.
Figure 7:
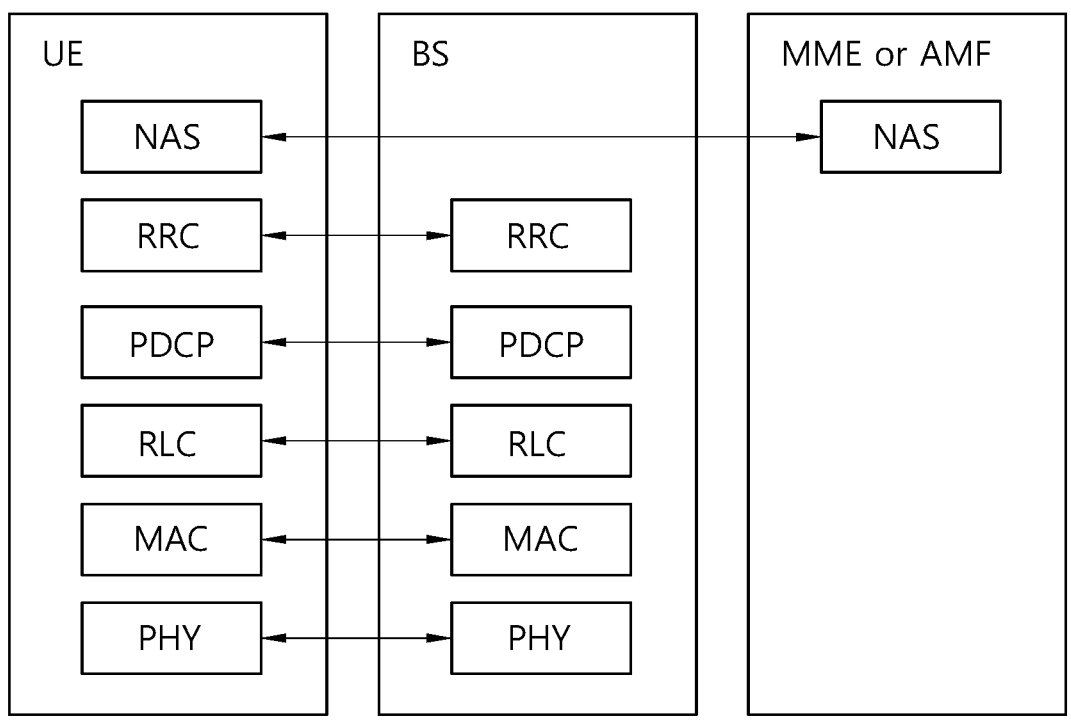

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
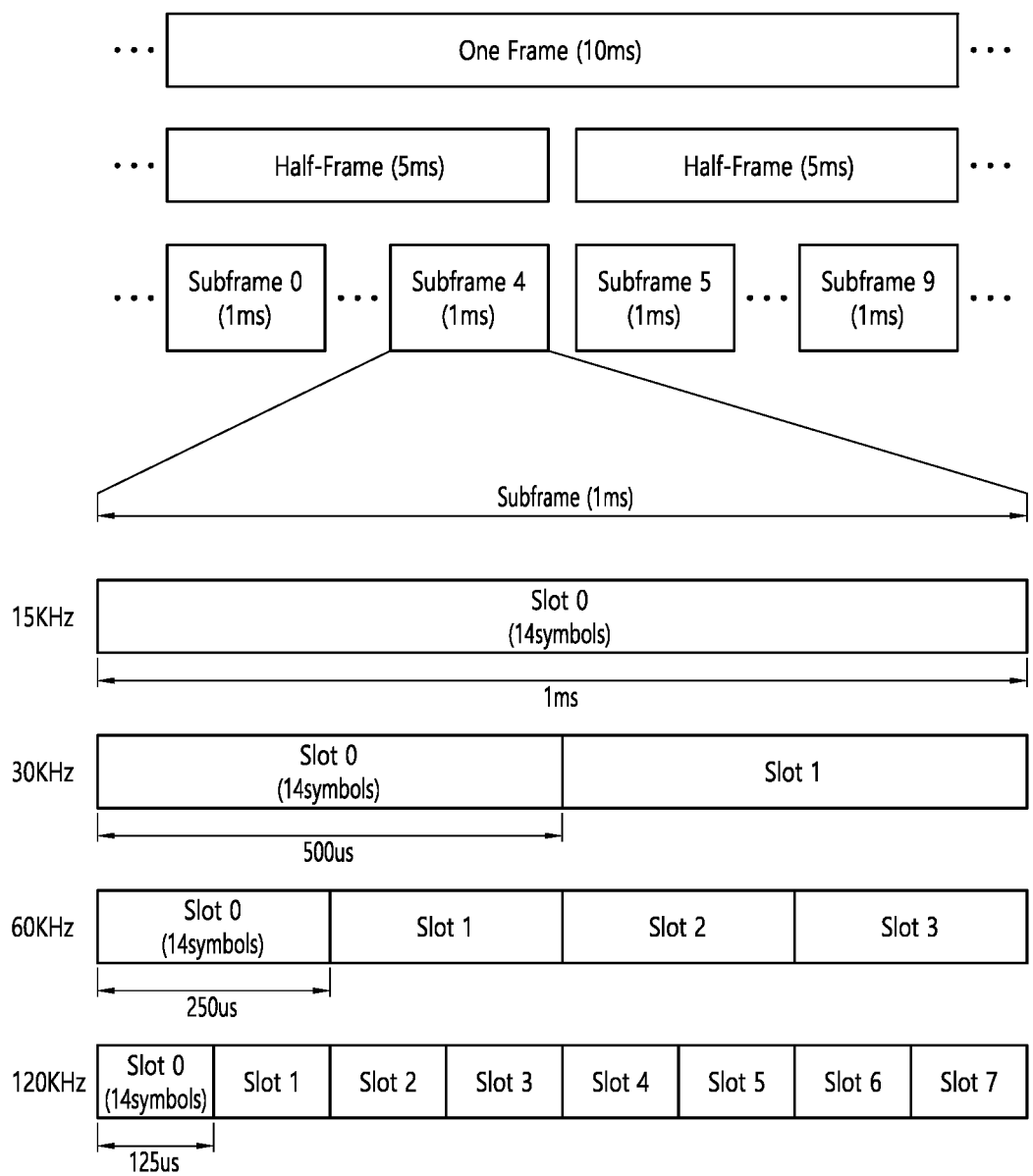
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index/representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i} - 1$, where i is the number of the bandwidth part. The relation between the physical resource block $n_{PRB}$ in the bandwidth part i and the common resource block $n_{CRB}$ is as follows: $n_{PRB} = n_{CRB} + N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
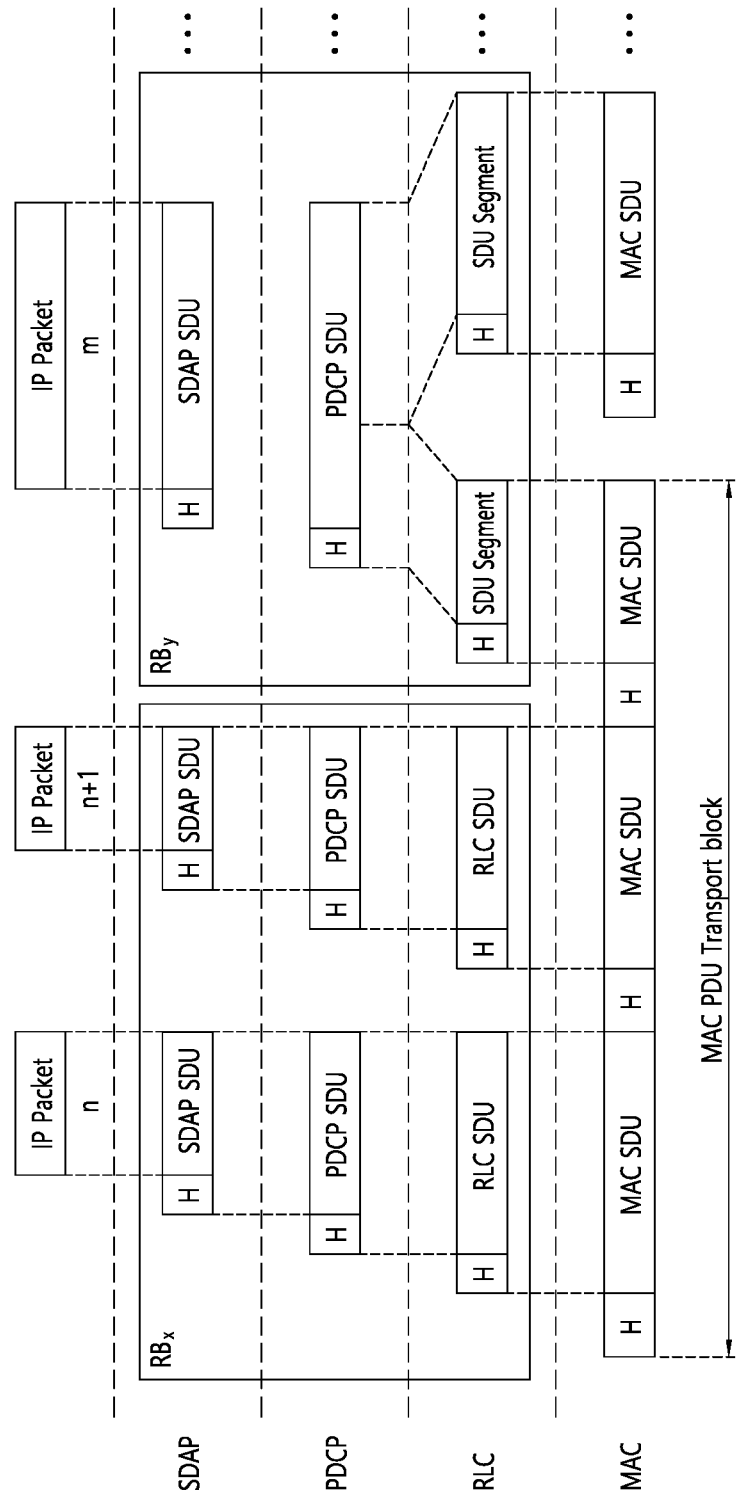
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

In order to transmit data unit(s) of the present disclosure on UL-SCH, a UE shall have uplink resources available to the UE. In order to receive data unit(s) of the present disclosure on DL-SCH, a UE shall have downlink resources available to the UE. The resource allocation includes time domain resource allocation and frequency domain resource allocation. In the present disclosure, uplink resource allocation is also referred to as uplink grant, and downlink resource allocation is also referred to as downlink assignment. An uplink grant is either received by the UE dynamically on PDCCH, in a random access response, or configured to the UE semi-persistently by RRC. Downlink assignment is either received by the UE dynamically on the PDCCH, or configured to the UE semi-persistently by RRC signaling from the BS.

In UL, the BS can dynamically allocate resources to UEs via the cell radio network temporary identifier (C-RNTI) on PDCCH(s). A UE always monitors the PDCCH(s) in order to find possible grants for uplink transmission when its downlink reception is enabled (activity governed by discontinuous reception (DRX) when configured). In addition, with configured grants, the BS can allocate uplink resources for the initial HARQ transmissions to UEs. Two types of configured uplink grants are defined: Type 1 and Type 2. With Type 1, RRC directly provides the configured uplink grant (including the periodicity). With Type 2, RRC defines the periodicity of the configured uplink grant while PDCCH addressed to configured scheduling RNTI (CS-RNTI) can either signal and activate the configured uplink grant, or deactivate it. That is, a PDCCH addressed to CS-RNTI indicates that the uplink grant can be implicitly reused according to the periodicity defined by RRC, until deactivated.

In DL, the BS can dynamically allocate resources to UEs via the C-RNTI on PDCCH(s). A UE always monitors the PDCCH(s) in order to find possible assignments when its downlink reception is enabled (activity governed by DRX when configured). In addition, with semi-persistent Scheduling (SPS), the BS can allocate downlink resources for the initial HARQ transmissions to UEs. RRC defines the periodicity of the configured downlink assignments while PDCCH addressed to CS-RNTI can either signal and activate the configured downlink assignment, or deactivate it. In other words, a PDCCH addressed to CS-RNTI indicates that the downlink assignment can be implicitly reused according to the periodicity defined by RRC, until deactivated.

For resource allocation by PDCCH (i.e., resource allocation by DCI), PDCCH can be used to schedule DL transmissions on PDSCH and UL transmissions on PUSCH, where the DCI on PDCCH includes: downlink assignments containing at least modulation and coding format (e.g., modulation and coding scheme (MCS) index $I_{MCS}$), resource allocation, and hybrid-ARQ information related to DL-SCH; or uplink scheduling grants containing at least modulation and coding format, resource allocation, and hybrid-ARQ information related to UL-SCH. The size and usage of the DCI carried by one PDCCH are varied depending on DCI formats. For example, in the 3GPP NR system, DCI format 0_0 or DCI format 0_1 is used for scheduling of PUSCH in one cell, and DCI format 1_0 or DCI format 1_1 is used for scheduling of PDSCH in one cell.

Figure 10:
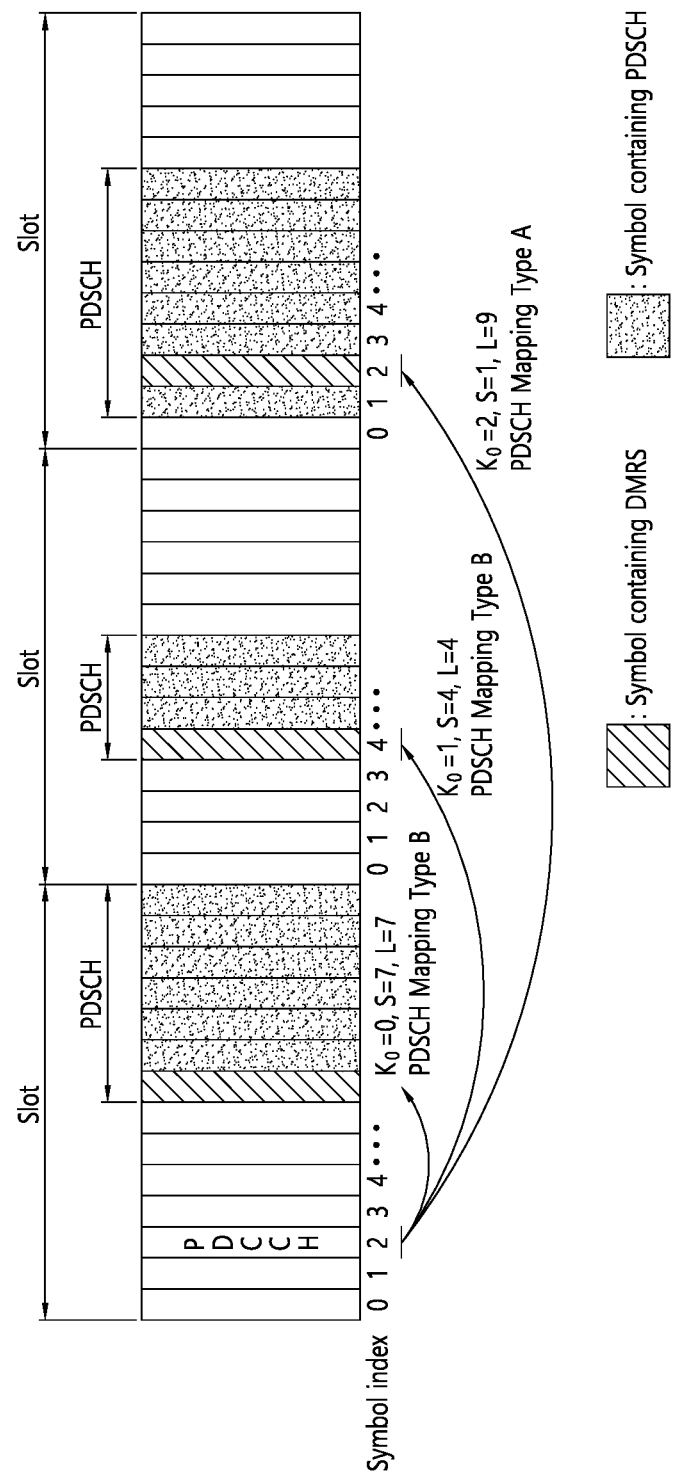
FIG. 10 shows an example of PDSCH time domain resource allocation by PDCCH to which implementations of the present disclosure is applied.
Figure 11:
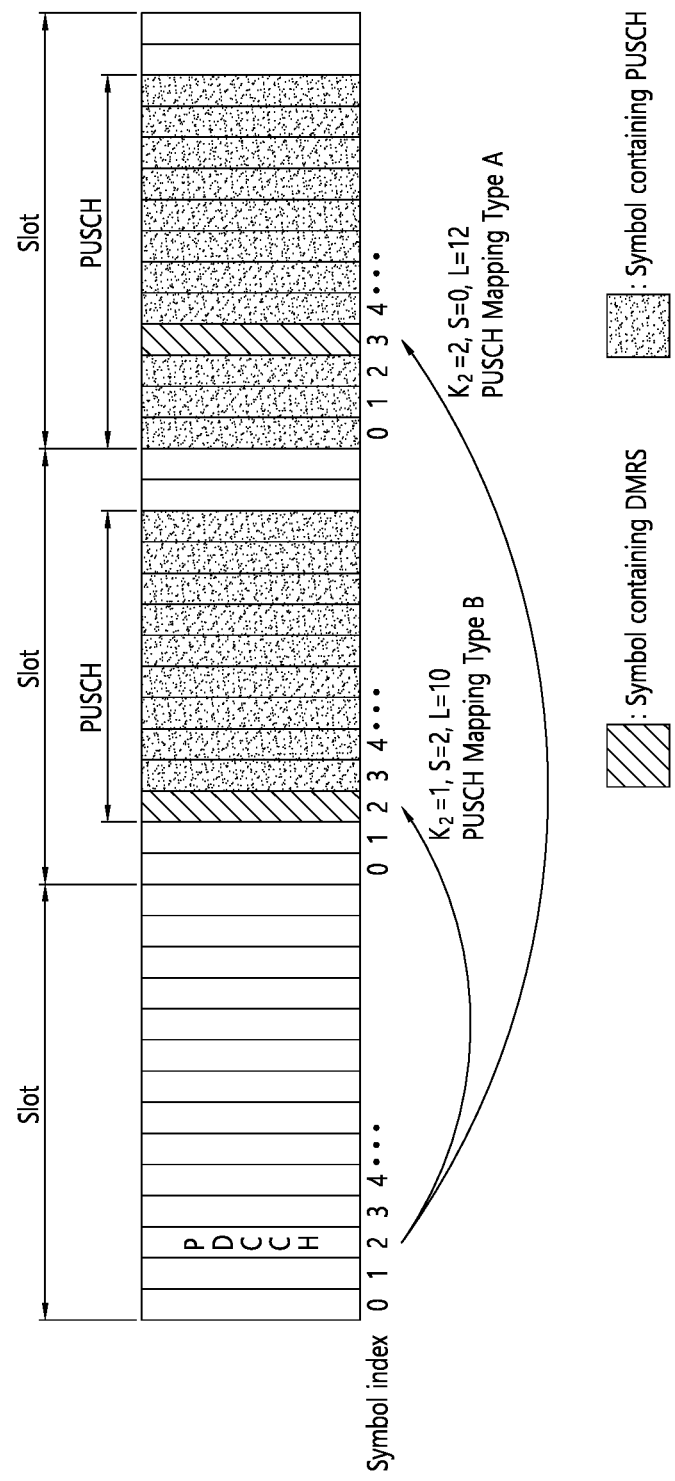
FIG. 11 shows an example of PUSCH time resource allocation by PDCCH to which implementations of the present disclosure is applied.

FIG. 10 shows an example of PDSCH time domain resource allocation by PDCCH to which implementations of the present disclosure is applied. FIG. 11 shows an example of PUSCH time resource allocation by PDCCH to which implementations of the present disclosure is applied.

DCI carried by a PDCCH for scheduling PDSCH or PUSCH includes a value m for a row index m+1 to an allocation table for PDSCH or PUSCH. Either a predefined default PDSCH time domain allocation A, B or C is applied as the allocation table for PDSCH, or RRC configured pdsch-TimeDomainAllocationList is applied as the allocation table for PDSCH. Either a predefined default PUSCH time domain allocation A is applied as the allocation table for PUSCH, or the RRC configured pusch-TimeDomainAllocationList is applied as the allocation table for PUSCH. Which PDSCH time domain resource allocation configuration to apply and which PUSCH time domain resource allocation table to apply are determined according to a fixed/predefined rule.

Each indexed row in PDSCH time domain allocation configurations defines the slot offset $K_0$, the start and length indicator SLIV, or directly the start symbol S and the allocation length L, and the PDSCH mapping type to be assumed in the PDSCH reception. Each indexed row in PUSCH time domain allocation configurations defines the slot offset $K_2$, the start and length indicator SLIV, or directly the start symbol S and the allocation length L, and the PUSCH mapping type to be assumed in the PUSCH reception. $K_0$ for PDSCH, or $K_2$ for PUSCH is the timing difference between a slot with a PDCCH and a slot with PDSCH or PUSCH corresponding to the PDCCH. SLIV is a joint indication of starting symbol S relative to the start of the slot with PDSCH or PUSCH, and the number L of consecutive symbols counting from the symbol S. For PDSCH/PUSCH mapping type, there are two mapping types: one is Mapping Type A where demodulation reference signal (DMRS) is positioned in $3^{rd}$ or $4^{th}$ symbol of a slot depending on the RRC signaling, and other one is Mapping Type B where DMRS is positioned in the first allocated symbol.

The scheduling DCI includes the Frequency domain resource assignment field which provides assignment information on resource blocks used for PDSCH or PUSCH. For example, the Frequency domain resource assignment field may provide a UE with information on a cell for PDSCH or PUSCH transmission, information on a bandwidth part for PDSCH or PUSCH transmission, information on resource blocks for PDSCH or PUSCH transmission.

For resource allocation by RRC, as mentioned above, in uplink, there are two types of transmission without dynamic grant: configured grant Type 1 where an uplink grant is provided by RRC, and stored as configured grant; and configured grant Type 2 where an uplink grant is provided by PDCCH, and stored or cleared as configured uplink grant based on L1 signaling indicating configured uplink grant activation or deactivation. Type 1 and Type 2 are configured by RRC per serving cell and per BWP. Multiple configurations can be active simultaneously only on different serving cells. For Type 2, activation and deactivation are independent among the serving cells. For the same serving cell, the MAC entity is configured with either Type 1 or Type 2.

A UE is provided with at least the following parameters via RRC signaling from a BS when the configured grant type 1 is configured:
  cs-RNTI which is CS-RNTI for retransmission;
  periodicity which provides periodicity of the configured grant Type 1; timeDomainOffset which represents offset of a resource with respect to SFN=0 in time domain;
  timeDomainAllocation value m which provides a row index m+1 pointing to an allocation table, indicating a combination of a start symbol S and length L and PUSCH mapping type;
  frequencyDomainAllocation which provides frequency domain resource allocation; and
  mcsAndTBS which provides $I_{MCS}$ representing the modulation order, target code rate and transport block size. Upon configuration of a configured grant Type 1 for a serving cell by RRC, the UE stores the uplink grant provided by RRC as a configured uplink grant for the indicated serving cell, and initialize or re-initialise the configured uplink grant to start in the symbol according to timeDomainOffset and S (derived from SLIV), and to reoccur with periodicity. After an uplink grant is configured for a configured grant Type 1, the UE considers that the uplink grant recurs associated with each symbol for which:
  [(SFN*numberOfSlotsPerFrame (numberOfSymbolsPerSlot)+(slot number in the frame×numberOfSymbolsPerSlot)+symbol number in the slot]= (timeDomainOffset*numberOfSymbolsPerSlot+S+ N*periodicity) modulo (1024*numberOfSlotsPerFrame*numberOfSymbolsPerSlot), for all N>=0.

A UE is provided with at least the following parameters via RRC signaling from a BS when the configured gran Type 2 is configured:
  cs-RNTI which is CS-RNTI for activation, deactivation, and retransmission; and
  periodicity which provides periodicity of the configured grant Type 2. The actual uplink grant is provided to the UE by the PDCCH (addressed to CS-RNTI). After an uplink grant is configured for a configured grant Type 2, the UE considers that the uplink grant recurs associated with each symbol for which:
  [(SFN*numberOfSlotsPerFrame*numberOfSymbolsPerSlot)+(slot number in the frame*numberOfSymbolsPerSlot)+symbol number in the slot]=[(SFN$_{start\ time}$*numberOfSlotsPerFrame*numberOfSymbolsPerSlot+ slot$_{start\ time}$*numberOfSymbolsPerSlot+ symbol$_{start\ time}$)+N*periodicity] modulo (1024× numberOfSlotsPerFrame*numberOfSymbolsPerSlot), for all N>=0, where SFN$_{start\ time}$, slot$_{start\ time}$, and symbol$_{start\ time}$ are the SFN, slot, and symbol, respectively, of the first transmission opportunity of PUSCH where the configured uplink grant was (re-)initialised. numberOfSlotsPerFrame and numberOfSymbolsPerSlot refer to the number of consecutive slots per frame and the number of consecutive OFDM symbols per slot, respectively.

For downlink, a UE may be configured with SPS per serving cell and per BWP by RRC signaling from a BS. Multiple configurations can be active simultaneously only on different serving cells. Activation and deactivation of the DL SPS are independent among the serving cells. For DL SPS, a DL assignment is provided to the UE by PDCCH, and stored or cleared based on L1 signaling indicating SPS activation or deactivation. A UE is provided with the following parameters via RRC signaling from a BS when SPS is configured:

cs-RNTI which is CS-RNTI for activation, deactivation, and retransmission;

nrofHARQ-Processes: which provides the number of configured HARQ processes for SPS;

periodicity which provides periodicity of configured downlink assignment for SPS. When SPS is released by upper layers, all the corresponding configurations shall be released.

After a downlink assignment is configured for SPS, the UE considers sequentially that the $N^{th}$ downlink assignment occurs in the slot for which:
(numberOfSlotsPerFrame*SFN+slot number in the frame)= [(numberOfSlotsPerFrame*SFN$_{start\ time}$+slot$_{start\ time}$)+ N*periodicity*numberOfSlotsPerFrame/10] modulo (1024*numberOfSlotsPerFrame), where SFN$_{start\ time}$ and slot$_{start\ time}$ are the SFN and slot, respectively, of the first transmission of PDSCH where the configured downlink assignment was (re-)initialized.

A UE validates, for scheduling activation or scheduling release, a DL SPS assignment PDCCH or configured UL grant type 2 PDCCH if the cyclic redundancy check (CRC) of a corresponding DCI format is scrambled with CS-RNTI provided by the RRC parameter cs-RNTI and the new data indicator field for the enabled transport block is set to 0. Validation of the DCI format is achieved if all fields for the DCI format are set according to Table 5 or Table 6 below. Table 5 shows special fields for DL SPS and UL grant Type 2 scheduling activation PDCCH validation, and Table 6 shows special fields for DL SPS and UL grant Type 2 scheduling release PDCCH validation.

TABLE 5

|  | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 6

|  | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and actual UL grant, and the corresponding modulation and coding scheme are provided by the resource assignment fields (e.g., time domain resource assignment field which provides Time domain resource assignment value m, frequency domain resource assignment field which provides the frequency resource block allocation, modulation and coding scheme field) in the DCI format carried by the DL SPS and UL grant Type 2 scheduling activation PDCCH. If validation is achieved, the UE considers the information in the DCI format as valid activation or valid release of DL SPS or configured UL grant Type 2. The data unit(s) of the present disclosure is(are) subject to the physical layer processing at a transmitting side before transmission via radio interface, and the radio signals carrying the data unit(s) of the present disclosure are subject to the physical layer processing at a receiving side.

Figure 12:
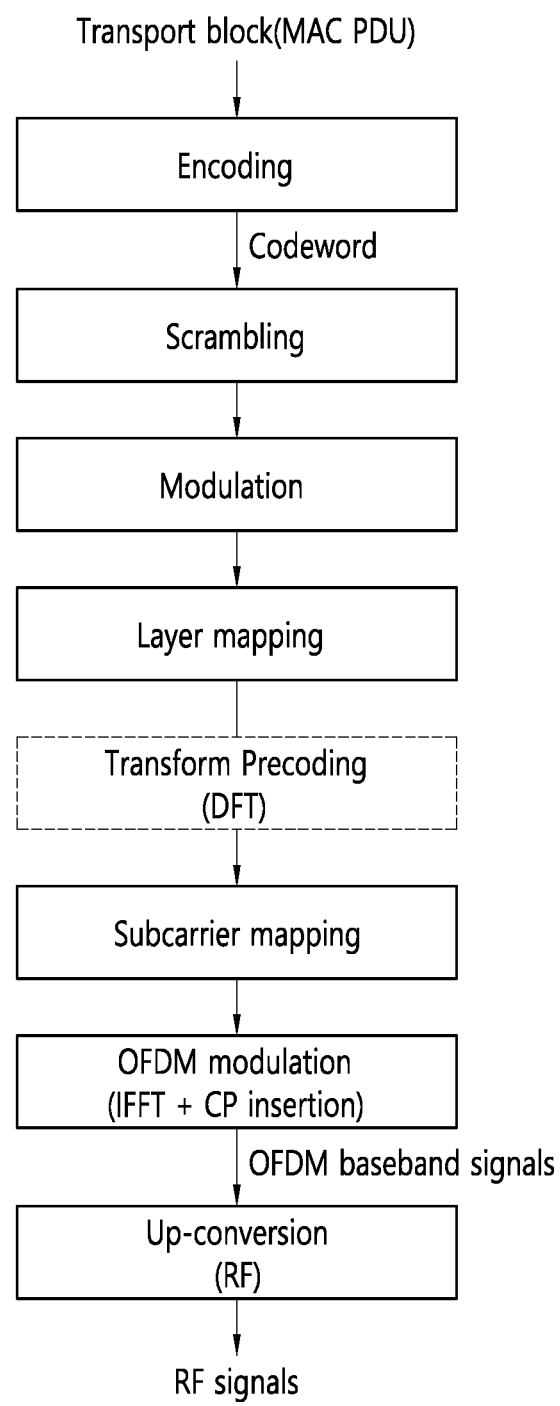
FIG. 12 shows an example of physical layer processing at a transmitting side to which implementations of the present disclosure is applied.

FIG. 12 shows an example of physical layer processing at a transmitting side to which implementations of the present disclosure is applied.

The following tables show the mapping of the transport channels and control information to its corresponding physical channels. In particular, Table 7 specifies the mapping of the uplink transport channels to their corresponding physical channels, Table 8 specifies the mapping of the uplink control channel information to its corresponding physical channel, Table 9 specifies the mapping of the downlink transport channels to their corresponding physical channels, and Table 10 specifies the mapping of the downlink control channel information to its corresponding physical channel.

TABLE 7

| Transport Channel | Physical Channel |
|---|---|
| UL-SCH | PUSCH |
| RACH | PRACH |

TABLE 8

| Control information | Physical Channel |
|---|---|
| UCI | PUCCH, PUSCH |

TABLE 9

| Transport Channel | Physical Channel |
|---|---|
| DL-SCH | PDSCH |
| BCH | PBCH |
| PCH | PDSCH |

| Control information | Physical Channel |
|---|---|
| DCI | PDCCH |

Each step of FIG. 12 is described below in detail.
1) Encoding

Data and control streams from/to MAC layer are encoded to offer transport and control services over the radio transmission link in the PHY layer. For example, a transport block from MAC layer is encoded into a codeword at a transmitting side. Channel coding scheme is a combination of error detection, error correcting, rate matching, interleaving and transport channel or control information mapping onto/splitting from physical channels.

In the NR LTE system, following channel coding schemes are used for the different types of transport channels and the different control information types. Table 11 specifies the mapping of transport channels to respective coding scheme. Table 12 specifies the mapping of control information to respective coding scheme.

TABLE 11

| Transport Channel | Coding scheme |
|---|---|
| UL-SCH | Low density parity check |
| DL-SCH | (LDPC) code |
| PCH |  |
| BCH | Polar code |

TABLE 12

| Control Information | Coding scheme |
|---|---|
| DCI | Polar code |
| UCI | Block code |
|  | Polar code |

For transmission of a DL transport block (i.e., a DL MAC PDU) or a UL transport block (i.e., a UL MAC PDU), a transport block CRC sequence is attached to provide error detection for a receiving side. In the 3GPP NR system, the communication device uses LDPC codes in encoding/decoding UL-SCH and DL-SCH. The 3GPP NR system supports two LDPC base graphs (i.e., two LDPC base matrixes): LDPC base graph 1 optimized for small transport blocks and LDPC base graph 2 for larger transport blocks. Either LDPC base graph 1 or 2 is selected based on the size of the transport block and coding rate R. The coding rate R is indicated by the MCS index $I_{MCS}$. The MCS index is dynamically provided to a UE by PDCCH scheduling PUSCH or PDSCH, provided to a UE by PDCCH activating or (re-)initializing the UL configured grant 2 or DL SPS, or provided to a UE by RRC signaling related to the UL configured grant Type 1. If the CRC attached transport block is larger than the maximum code block size for the selected LDPC base graph, the CRC attached transport block may be segmented into code blocks, and an additional CRC sequence is attached to each code block. The maximum code block sizes for the LDPC base graph 1 and the LDPC base graph 2 are 8448 bits and 3480 bits, respectively. If the CRC attached transport block is not larger than the maximum code block size for the selected LDPC base graph, the CRC attached transport block is encoded with the selected LDPC base graph. Each code block of the transport block is encoded with the selected LDPC base graph. The LDPC coded blocks are then individually rat matched. Code block concatenation is performed to create a codeword for transmission on PDSCH or PUSCH. For PDSCH, up to 2 codewords (i.e., up to 2 transport blocks) can be transmitted simultaneously on the PDSCH. PUSCH can be used for transmission of UL-SCH data and layer 1/2 control information. Although not shown in FIG. 12, the layer 1/2 control information may be multiplexed with the codeword for UL-SCH data.

2) Scrambling and Modulation

The bits of the codeword are scrambled and modulated to generate a block of complex-valued modulation symbols.

3) Layer Mapping

The complex-valued modulation symbols of the codeword are mapped to one or more multiple input multiple output (MIMO) layers. A codeword can be mapped to up to 4 layers. A PDSCH can carry two codewords, and thus a PDSCH can support up to 8-layer transmission. A PUSCH supports a single codeword, and thus a PUSCH can support up to 4-layer transmission.

4) Transform Precoding

The DL transmission waveform is conventional OFDM using a cyclic prefix (CP). For DL, transform precoding (in other words, DFT) is not applied.

The UL transmission waveform is conventional OFDM using a CP with a transform precoding function performing DFT spreading that can be disabled or enabled. In the 3GPP NR system, for UL, the transform precoding can be optionally applied if enabled. The transform precoding is to spread UL data in a special way to reduce peak-to-average power ratio (PAPR) of the waveform. The transform precoding is a form of DFT. In other words, the 3GPP NR system supports two options for UL waveform: one is CP-OFDM (same as DL waveform) and the other one is DFT-s-OFDM. Whether a UE has to use CP-OFDM or DFT-s-OFDM is determined by a BS via RRC parameters.

5) Subcarrier Mapping

The layers are mapped to antenna ports. In DL, for the layers to antenna ports mapping, a transparent manner (non-codebook based) mapping is supported and how beamforming or MIMO precoding is performed is transparent to the UE. In UL, for the layers to antenna ports mapping, both the non-codebook based mapping and a codebook based mapping are supported.

For each antenna port (i.e., layer) used for transmission of the physical channel (e.g., PDSCH, PUSCH), the complex-valued modulation symbols are mapped to subcarriers in resource blocks allocated to the physical channel.

6) OFDM Modulation

The communication device at the transmitting side generates a time-continuous OFDM baseband signal on antenna port p and subcarrier spacing configuration u for OFDM symbol l in a TTI for a physical channel by adding a CP and performing inverse fast Fourier transform (IFFT). For example, for each OFDM symbol, the communication device at the transmitting side may perform IFFT on the complex-valued modulation symbols mapped to resource blocks in the corresponding OFDM symbol and add a CP to the IFFT-ed signal to generate the OFDM baseband signal.

7) Up-Conversion

The communication device at the transmitting side up-converts the OFDM baseband signal for antenna port p, subcarrier spacing configuration u and OFDM symbol l to a carrier frequency $f_0$ of a cell to which the physical channel is assigned.

The processor 102, 202 in FIG. 2, the processor included in the communication unit 112 and/or the control unit 120 in FIG. 3, the processor 102, 202 in FIG. 4 and/or the processor 102 in FIG. 5 may be configured to perform encoding, scrambling, modulation, layer mapping, transform precoding (for UL), subcarrier mapping, and OFDM modulation. The processor 102, 202 in FIG. 2, the processor included in the communication unit 112 and/or the control unit 120 in FIG. 3, the processor 102, 202 in FIG. 4 and/or the processor 102 in FIG. 5 may control the transceiver 106, 206 in FIG. 2, the transceiver 114 in FIG. 3, the transceiver 106, 206 in FIG. 4 and/or the transceiver 106 in FIG. 5 to up-convert the OFDM baseband signal onto the carrier frequency to generate radio frequency (RF) signals. The radio frequency signals are transmitted through antennas to an external device.

Figure 13:
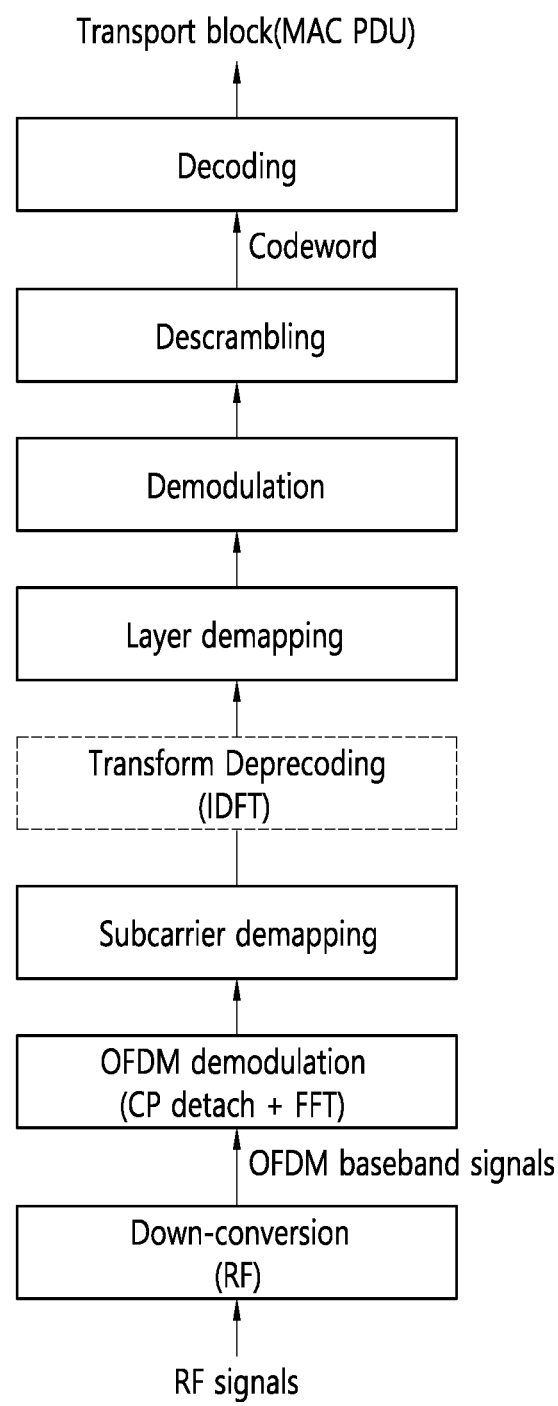
FIG. 13 shows an example of physical layer processing at a receiving side to which implementations of the present disclosure is applied.

FIG. 13 shows an example of physical layer processing at a receiving side to which implementations of the present disclosure is applied.

The physical layer processing at the receiving side is basically the inverse processing of the physical layer processing at the transmitting side. Each step of FIG. 13 is described below in detail.

1) Frequency Down-Conversion

The communication device at a receiving side receives RF signals at a carrier frequency through antennas. The transceiver 106, 206 in FIG. 2, the transceiver 114 in FIG. 3, the transceiver 106, 206 in FIG. 4 and/or the transceiver 106 in FIG. 5 receiving the RF signals at the carrier frequency down-converts the carrier frequency of the RF signals into the baseband in order to obtain OFDM baseband signals.

2) OFDM Demodulation

The communication device at the receiving side obtains complex-valued modulation symbols via CP detachment and FFT. For example, for each OFDM symbol, the communication device at the receiving side removes a CP from the OFDM baseband signals and performs FFT on the CP-removed OFDM baseband signals to obtain complex-valued modulation symbols for antenna port p, subcarrier spacing u and OFDM symbol l.

3) Subcarrier De-Mapping

The subcarrier de-mapping is performed on the complex-valued modulation symbols to obtain complex-valued modulation symbols of a corresponding physical channel. For example, the UE processor may obtain complex-valued modulation symbols mapped to subcarriers belong to PDSCH from among complex-valued modulation symbols received in a bandwidth part.

4) Transform De-Precoding

Transform de-precoding (e.g., inverse DFT (IDFT)) is performed on the complex-valued modulation symbols of the uplink physical channel if the transform precoding has been enabled for the uplink physical channel. For the downlink physical channel and for the uplink physical channel for which the transform precoding has been disabled, the transform de-precoding is not performed.

5) Layer De-Mapping.

The complex-valued modulation symbols are de-mapped into one or two codewords.

6) Demodulation and De-Scrambling

The complex-valued modulation symbols of a codeword are demodulated and descrambled into bits of the codeword.

7) Decoding

The codeword is decoded into a transport block. For UL-SCH and DL-SCH, either LDPC base graph 1 or 2 is selected based on the size of the transport block and coding rate R. The codeword may include one or multiple coded blocks. Each coded block is decoded with the selected LDPC base graph into a CRC-attached code block or CRC-attached transport block. If code block segmentation was performed on a CRC-attached transport block at the transmitting side, a CRC sequence is removed from each of CRC-attached code blocks, whereby code blocks are obtained. The code blocks are concatenated into a CRC-attached transport block. The transport block CRC sequence is removed from the CRC-attached transport block, whereby the transport block is obtained. The transport block is delivered to the MAC layer.

In the above described physical layer processing at the transmitting and receiving sides, the time and frequency domain resources (e.g., OFDM symbol, subcarriers, carrier frequency) related to subcarrier mapping, OFDM modulation and frequency up/down conversion can be determined based on the resource allocation (e.g., UL grant, DL assignment).

Licensed-Assisted Access operation is described. It may be referred to as Section 5.7 of 3GPP TS 36.300 v15.3.0 (2018 September).

Carrier aggregation with at least one secondary cell (SCell) operating in the unlicensed spectrum is referred to as licensed-assisted access (LAA). In LAA, the configured set of serving cells for a UE therefore always includes at least one SCell operating in the unlicensed spectrum according to frame structure Type 3, also called LAA SCell. Unless otherwise specified, LAA SCells act as regular SCells.

LAA eNB and UE apply listen-before-talk (LBT) before performing a transmission on LAA SCell. When LBT is applied, the transmitter listens to/senses the channel to determine whether the channel is free or busy. If the channel is determined to be free, the transmitter may perform the transmission. Otherwise, it does not perform the transmission. If an LAA eNB uses channel access signals of other technologies for the purpose of LAA channel access, it shall continue to meet the LAA maximum energy detection threshold requirement.

NR standalone operation on unlicensed bands is described. Technologies of LLA operation described above could be applied to NR standalone operation on unlicensed bands. In LTE LAA, a cell on an unlicensed bands is not considered as primary cell (PCell), but only as secondary cell (SCell). On the other hand, In NR standalone operation on unlicensed bands, a cell on an unlicensed bands can be considered as a PCell.

Hereinafter, RRC connection re-establishment will be described. It may be referred to as Section 5.3.7 of 3GPP TS 38.331 v15.3.0.

The purpose of this procedure is to re-establish the RRC connection. A UE in RRC_CONNECTED, for which security has been activated with SRB2 and at least one DRB setup, may initiate the procedure in order to continue the RRC connection. The connection re-establishment succeeds if the network is able to find and verify a valid UE context or, if the UE context cannot be retrieved, and the network responds with an RRCSetup. If AS security has not been activated, the UE does not initiate the procedure but instead moves to RRC_IDLE directly, with release cause 'other'. If AS security has been activated, but SRB2 and at least one DRB are not setup, the UE does not initiate the procedure but instead moves to RRC_IDLE directly, with release cause 'RRC connection failure'.

The network applies the procedure as follows:
When AS security has been activated and the network retrieves or verifies the UE context:
to re-activate AS security without changing algorithms;
to re-establish and resume the SRB1;
When UE is re-establishing an RRC connection, and the network is not able to retrieve or verify the UE context:
to discard the stored AS Context and release all RB;
fallback to establish a new RRC connection.

The UE initiates the RRC connection re-establishment procedure when one of the following conditions is met:
1> upon detecting radio link failure of the MCG; or
1> upon re-configuration with sync failure of the MCG; or
1> upon mobility from NR failure; or
1> upon integrity check failure indication from lower layers concerning SRB1 or SRB2, except if the integrity check failure is detected on the RRCReestablishment message; or
1> upon an RRC connection reconfiguration failure.

Upon initiation of the procedure, the UE shall:
1> stop timer T310, if running;
1> stop timer T304, if running;
1> start timer T311;
1> suspend all RBs, except SRB0;
1> reset MAC;
1> release the MCG SCell(s), if configured;
1> release the current dedicated ServingCell configuration;
1> release delayBudgetReportingConfig, if configured, and stop timer T342, if running;
1> release overheatingAssistanceConfig, if configured and stop timer T345, if running;
1> perform cell selection in accordance with the cell selection process Actions following cell selection while T311 is running will be described.

Upon selecting a suitable NR cell, the UE shall:
1> ensure having valid and up to date essential system information;
1> stop timer T311;
1> start timer T301;
1> if T390 is running:
2> stop timer T390 for all access categories;
1> apply the default L1 parameter values as specified in corresponding physical layer specifications except for the parameters for which values are provided in SIB1;
1> apply the default MAC Cell Group configuration;
1> apply the timeAlignmentTimerCommon included in SIB1;
1> initiate transmission of the RRCReestablishmentRequest message;
NOTE: This procedure applies also if the UE returns to the source PCell.

Upon selecting an inter-RAT cell, the UE shall:
1> perform the actions upon going to RRC_IDLE, with release cause 'RRC connection failure'.

Hereinafter, Cell status and cell reservations will be described. It may be referred to as section5.3.1 of 3GPP TS 38.304 v15.2.0.

Cell status and cell reservations are indicated in the MIB or SIB1 message by means of three fields:
cellBarred (IE type: "barred" or "not barred")
Indicated in MIB message. In case of multiple PLMNs indicated in SIB1, this field is common for all PLMNs
cellReservedForOperatorUse (IE type: "reserved" or "not reserved")
Indicated in SIB1 message. In case of multiple PLMNs indicated in SIB1, this field is specified per PLMN.
cellReservedForOtherUse (IE type: "true")
Indicated in SIB1 message. In case of multiple PLMNs indicated in SIB1, this field is common for all PLMNs.

When cell status is indicated as "not barred" and "not reserved" for operator use and not "true" for other use,
All UEs shall treat this cell as candidate during the cell selection and cell reselection procedures.
When cell status is indicated as "true" for other use,
The UE shall treat this cell as if cell status is "barred".
When cell status is indicated as "not barred" and "reserved" for operator use for any PLMN and not "true" for other use,
UEs assigned to Access Identity 11 or 15 operating in their HPLMN/EHPLMN shall treat this cell as candidate during the cell selection and reselection procedures if the field cellReservedForOperatorUse for that PLMN set to "reserved".
UEs assigned to an Access Identity 1, 2 and 12 to 14 shall behave as if the cell status is "barred" in case the cell is "reserved for operator use" for the registered PLMN or the selected PLMN.
NOTE 1: Access Identities 11, 15 are only valid for use in the HPLMN/EHPLMN; Access Identities 12, 13, 14 are only valid for use in the home country.
When cell status "barred" is indicated or to be treated as if the cell status is "barred",
The UE is not permitted to select/reselect this cell, not even for emergency calls.
The UE shall select another cell according to the following rule:
If the cell is to be treated as if the cell status is "barred" due to being unable to acquire the MIB:
the UE may exclude the barred cell as a candidate for cell selection/reselection for up to 300 seconds.
the UE may select another cell on the same frequency if the selection criteria are fulfilled.
else:
If the cell is to be treated as if the cell status is "barred" due to being unable to acquire the SIB1:
The UE may exclude the barred cell as a candidate for cell selection/reselection for up to 300 seconds.
If the field intraFreqReselection in MIB message is set to "allowed", the UE may select another cell on the same frequency if re-selection criteria are fulfilled;
The UE shall exclude the barred cell as a candidate for cell selection/reselection for 300 seconds.
If the field intraFreqReselection in MIB message is set to "not allowed" the UE shall not re-select a cell on the same frequency as the barred cell;
The UE shall exclude the barred cell and the cells on the same frequency as a candidate for cell selection/reselection for 300 seconds.
The cell selection of another cell may also include a change of RAT.

Meanwhile, upon detecting radio link failure of the master cell group (MCG), UE may initiate the RRC re-establishment procedure to recover the radio link. Upon initiation of the RRC re-establishment procedure, the UE may perform cell selection procedure. The UE may optimise cell selection by using stored information, for example, frequencies. Optionally, the wireless device may also use information on cell parameters from previously received measurement control information elements or from previously detected cells for the cell selection.

UE may declare radio link failure (RLF), when N-consecutive LBT failures happen on an unlicensed frequency. Upon declaring RLF, the UE may perform cell selection using stored information. In this case, the UE may generally perform the cell selection on the last serving frequency.

However, it is likely that the last serving frequency is still busy and the RRC re-establishment procedure fails due to LBT failure.

Therefore, if the RLF is declared on busy unlicensed frequency, different handling is needed so that the UE can perform the cell selection on less-busy frequency.

Hereinafter, a method and apparatus for handling RLF on unlicensed frequency in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 14:
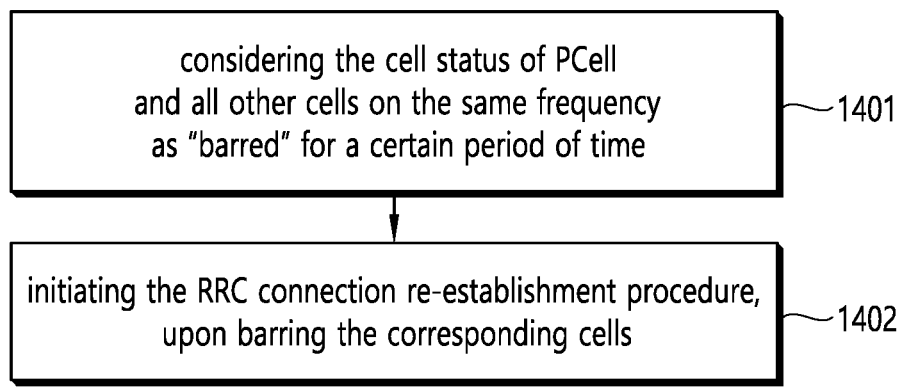
FIG. 14 shows an example of a method for handling RLF on unlicensed frequency in a wireless communication system, according to some embodiments of the present disclosure.

FIG. 14 shows an example of a method for handling RLF on unlicensed frequency in a wireless communication system, according to some embodiments of the present disclosure. In particular, FIG. 14 shows an example of a method for handling RLF performed by a wireless device.

If RLF is declared because of LBT failure on unlicensed frequency, this means that the UE is likely to fail the RRC connection re-establishment on the unlicensed frequency because the UE may select a cell on that frequency and the frequency may be still busy.

The present disclosure may provide additional/alternative procedure when RLF is declared on the unlicensed frequency, because the conventional RRC connection re-establishment is intended for recovery when radio quality of serving cell becomes worse. For example, a wireless device may bar all cells on that frequency. Therefore, the recovery failure rate could be reduced when the RLF happens on unlicensed frequency.

In step 1401, UE may consider the cell status of PCell and all other cells on the same frequency (for example, last serving frequency) as "barred" for a certain period of time, when at least one of following conditions is met.
Condition 1: Uplink LBT fails N-times in a row for MCG.
Condition 2: Uplink LBT keeps failing for a certain period of time for MCG.
Condition 3: Radio link failure (RLF) happens due to LBT failure for MCG (for example, due to Condition 1 and/or 2).
Condition 4: RLF is detected for MCG and PCell is on an unlicensed frequency.
Condition 5: RLF is detected for MCG and the measurement results of channel occupancy or RSSI for PCell frequency is higher than the threshold.

If a cell status is "barred", the UE cannot camp on the cell. The period for barring may be configured by network or may be pre-defined. For example, the period may be 300 seconds.

Alternatively and/or additionally, UE may consider all cells on all unlicensed frequencies as "barred" for a certain period of time, when at least one of the above conditions is met.

In step 1402, the UE may initiate the RRC connection re-establishment procedure, upon barring the corresponding cells.

Alternatively and/or additionally, if at least one of above conditions is met, UE may disable the unlicensed frequency operation for a certain period time. In this case, the UE may not camp on a cell on an unlicensed frequency for a certain period time. Optionally, UE may not perform the measurements for unlicensed frequency for a certain period time. Upon disabling the unlicensed frequency operation, the UE may initiate the RRC connection re-establishment procedure.

Alternatively and/or additionally, if the measurement results of channel occupancy or RSSI for an unlicensed frequency is higher than a threshold, UE may consider the cell status of all cells on the unlicensed frequency as "barred" for a certain period time. Upon barring all cells on the unlicensed frequency, the UE may initiate the RRC connection re-establishment procedure.

Alternatively and/or additionally, if at least one of above conditions is met, UE may consider the PCell frequency to be the lowest priority frequency (for example, lower than any of the network configured values). In this case, the UE may perform cell re-selection, not cell selection procedure to find a cell to camp on for recovery.

Figure 15:
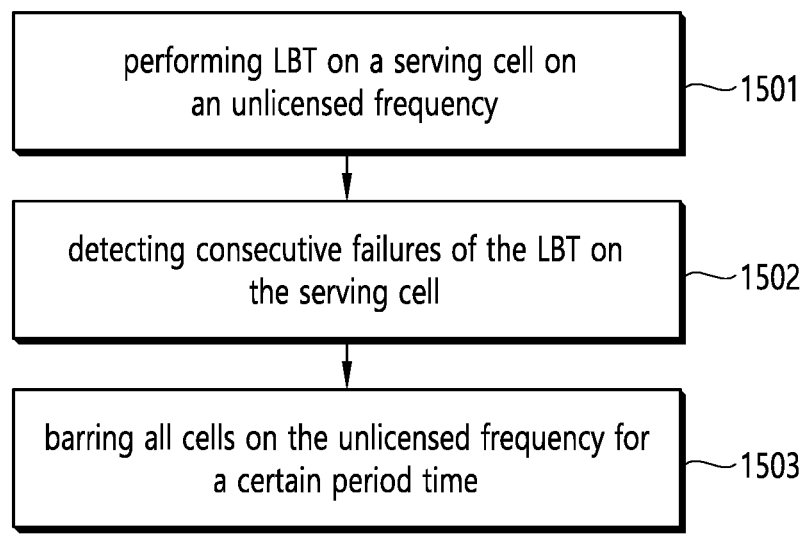
FIG. 15 shows an example of a method for handling RLF on unlicensed frequency in a wireless communication system, according to some embodiments of the present disclosure.

FIG. 15 shows an example of a method for handling RLF on unlicensed frequency in a wireless communication system, according to some embodiments of the present disclosure. In particular, FIG. 15 shows an example of a method for handling RLF performed by a wireless device.

In step 1501, a wireless device may perform Listen Before Talk (LBT) procedure on a serving cell on an unlicensed frequency.

When a wireless device is in RRC_CONNECTED state, the wireless device may perform the LBT procedure on a primary cell (PCell) on the unlicensed frequency. That is, the serving cell, in step 1501, could be the PCell.

In step 1502, a wireless device may detect consecutive failures of the LBT on the serving cell.

According to some embodiments of the present disclosure, the wireless device may declare radio link failure (RLF) upon detecting the consecutive failures of the LBT.

In step 1503, a wireless device may bar all cells on the unlicensed frequency for a certain period time. For example, the certain period time is configured by a network. For other example, the certain period time is pre-defined by the wireless device.

According to some embodiments of the present disclosure, a wireless device may disable operation on the unlicensed frequency for the certain period time. For example, the wireless device may disable performing measurements for the unlicensed frequency.

According to some embodiments of the present disclosure, a wireless device may select a cell on another frequency other than the unlicensed frequency, upon barring the all cells on the unlicensed frequency. For example, the wireless device may select a cell on a licensed frequency. In addition, a wireless device may establish or re-establish RRC connection to the selected cell on the other frequency.

According to some embodiments of the present disclosure, a wireless device may deprioritize an unlicensed frequency to be a lowest priority frequency, instead of barring all cell on the unlicensed frequency for a certain period time.

For example, a wireless device may perform LBT on a serving cell on an unlicensed frequency. A wireless device may detect consecutive failures of the LBT on the serving cell. A wireless device may deprioritize an unlicensed frequency to be a lowest priority frequency for a certain period time, upon detecting the consecutive failures of the LBT procedure on the serving cell.

According to some embodiments of the present disclosure, a wireless device may be in communication with at least one of a user equipment, a network, or an autonomous vehicle other than the wireless device.

Figure 16:
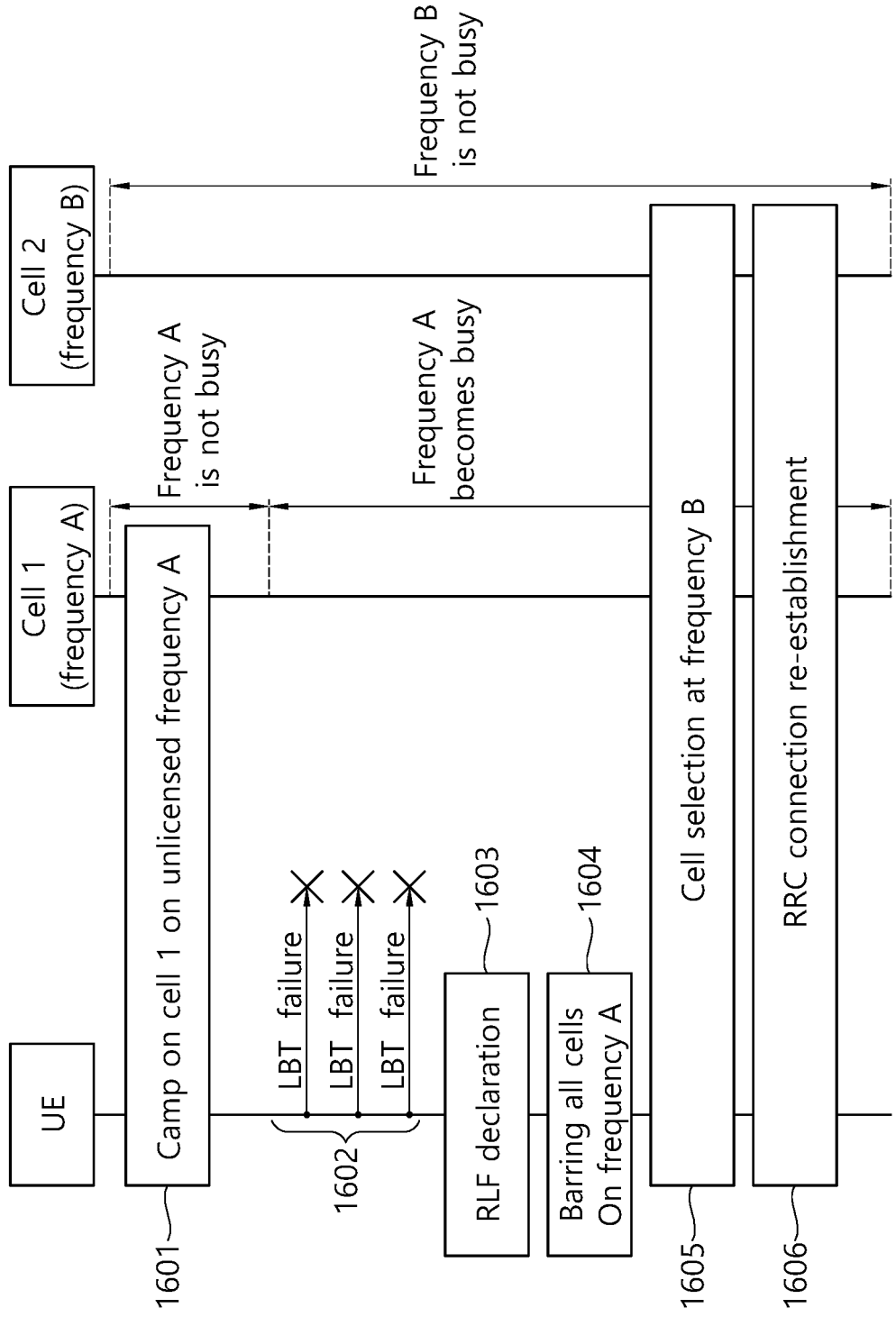
FIG. 16 shows an example of a method for handling RLF on unlicensed frequency in a wireless communication system, according to some embodiments of the present disclosure.

FIG. 16 shows an example of a method for handling RLF on unlicensed frequency in a wireless communication system, according to some embodiments of the present disclosure.

In step 1601, UE may be camped on cell 1 on unlicensed frequency A.

In step 1602, UE may detect consecutive uplink LBT failures.

In step 1603, UE may declare the radio link failure for the MCG when the PCell is operated on an unlicensed frequency.

In step 1604, UE may bar all cells on the unlicensed frequency A. For example, upon RLF declaration, the UE may consider the cell status of the PCell and all other cells on the same frequency as "barred" for a certain period time.

In other words, the UE may consider all cells of the unlicensed frequency A as "barred" for a certain period time.

In step 1605 and step 1606, UE may perform cell selection at frequency B and re-establish the RRC connection.

For example, after declaring the RLF and barring all cells on the frequency A, UE may initiate the RRC connection re-establishment procedure. Upon initiation of the RRC connection re-establishment procedure, the UE may perform cell selection procedure. In this case, the UE may not select any cell on the last PCell frequency (for example, unlicensed frequency A) because all cells on that frequency is considered as "barred". The UE may select a cell on other frequency than the last PCell frequency. The UE may complete the RRC connection re-establishment to the selected cell.

The present disclosure can have various advantageous effects.

According to some embodiments of the present disclosure described with reference to FIGS. 14 and 16, a wireless device could handle RLF on unlicensed frequency.

For example, a wireless device could perform a cell selection on less-busy frequency. In particular, after RLF is declared because of LBT failure on unlicensed frequency, the frequency could be still busy for a while. The wireless device may succeed the RRC connection re-establishment on another frequency, since a wireless device selects another cell on the other frequency.

For example, the recovery failure rate could be reduced when the RLF happens on unlicensed frequency, since a wireless device may bar all cells on that frequency.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
    performing a Listen Before Talk (LBT) procedure on a serving Primary Cell (PCell) on a serving shared spectrum, wherein the wireless device is in an RRC_CONNECTED state;
    detecting consecutive failures of the LBT procedure on the serving PCell;
    declaring radio link failure (RLF) on the serving shared spectrum upon detecting the consecutive failures of the LBT procedure on the serving PCell;
    considering all cells on multiple shared spectrums configured for the wireless device as barred for a certain period time, wherein the serving shared spectrum is included in the multiple shared spectrums;
    disabling operations for the multiple shared spectrums during the certain period time, wherein the operations on the multiple shared spectrums include performing measurements for the serving shared spectrum;
    initiating a radio resource control (RRC) connection re-establishment procedure upon the disabling operations for the multiple shared spectrums;
    performing cell selection procedure only for cells on a licensed frequency, and not for cells on the multiple shared spectrums, during the certain period time;
    selecting a cell on the licensed frequency from the cell selection procedure; and
    establishing an RRC connection to the selected cell on the licensed frequency.

2. The method of claim 1, wherein the certain period time is configured by a network.

3. The method of claim 1, wherein the certain period time is pre-defined by the wireless device.

4. The method of claim 1, wherein the wireless device is in communication with at least one of a user equipment, a network, or an autonomous vehicle other than the wireless device.

5. A wireless device in a wireless communication system comprising:
    a transceiver;
    a memory; and
    at least one processor operatively coupled to the transceiver and the memory, and adapted to:
    perform a Listen Before Talk (LBT) procedure on a serving Primary Cell (PCell) on a serving shared spectrum, wherein the wireless device is in an RRC CONNECTED state;
    detect consecutive failures of the LBT procedure on the serving PCell;
    declare radio link failure (RLF) on the serving shared spectrum upon detecting the consecutive failures of the LBT procedure on the serving PCell;
        consider all cells on multiple shared spectrums configured for the wireless device as barred for a certain period time, wherein the serving shared spectrum is included in the multiple shared spectrums;
    disable operations for the multiple shared spectrums during the certain period time, wherein the operations on the multiple shared spectrums include performing measurements for the serving shared spectrum;
    initiate a radio resource control (RRC) connection re-establishment procedure upon the disabling operations for the multiple shared spectrums;
    perform cell selection procedure only for cells on a licensed frequency, and not for cells on the multiple shared spectrums, during the certain period time;
    select a cell on the licensed frequency from the cell selection procedure; and
    establish an RRC connection to the selected cell on the licensed frequency.

6. The method of claim 1, wherein the method further comprises:
    considering the shared spectrum to be a lowest priority frequency for the certain period time, wherein the certain period time is pre-defined by the wireless device.

* * * * *